United States Patent
Peng et al.

(10) Patent No.: US 12,177,947 B2
(45) Date of Patent: Dec. 24, 2024

(54) MAGNETIC INDUCTION CIRCUIT, MAGNETIC-CONTROLLED SWITCH CIRCUIT, CIRCUIT BOARD, MAGNETIC-CONTROLLED DEVICE, AND MAGNETIC-CONTROLLED LAMP

(71) Applicant: Shenzhen Above Lights Co., Ltd., Shenzhen (CN)

(72) Inventors: Guogang Peng, Shenzhen (CN); Zhifu You, Shenzhen (CN)

(73) Assignee: Shenzhen Above Lights Co., Ltd., Shenzhen (CN)

( * ) Notice: Subject to any disclaimer, the term of this patent is extended or adjusted under 35 U.S.C. 154(b) by 43 days.

(21) Appl. No.: 17/980,795

(22) Filed: Nov. 4, 2022

(65) Prior Publication Data

US 2023/0047388 A1 Feb. 16, 2023

Related U.S. Application Data

(63) Continuation of application No. PCT/CN2020/122557, filed on Oct. 21, 2020.

(30) Foreign Application Priority Data

May 6, 2020 (CN) .......................... 202010371536.X

(51) Int. Cl.
| | | |
|---|---|---|
| H05B 41/00 | (2006.01) | |
| G01D 5/14 | (2006.01) | |
| H05B 41/23 | (2006.01) | |
| H05B 41/26 | (2006.01) | |
| H05B 41/392 | (2006.01) | |
| H05B 47/105 | (2020.01) | |

(52) U.S. Cl.
CPC ............. *H05B 41/23* (2013.01); *G01D 5/145* (2013.01); *H05B 41/26* (2013.01); *H05B 41/392* (2013.01); *H05B 47/105* (2020.01)

(58) Field of Classification Search
CPC ...... H05B 41/23; H05B 41/26; H05B 41/392; H05B 47/105; G01D 5/145
See application file for complete search history.

(56) References Cited

U.S. PATENT DOCUMENTS 6,281,641 B1 * 8/2001 Chen .................... H05B 41/392
                                                    315/307
6,362,575 B1    3/2002 Chang et al.
(Continued)

FOREIGN PATENT DOCUMENTS

| CN | 201114964 Y | 9/2008 |
|---|---|---|
| CN | 101815386 A | 8/2010 |
| CN | 202261764 U | 5/2012 |

(Continued)

*Primary Examiner* — Tuan T Lam

(57) ABSTRACT

A magnetic induction circuit, a magnetic-controlled switch circuit, a magnetic-controlled device and a magnetic-controlled lamp. The magnetic induction circuit includes a magnetic induction module, a voltage comparison module and a voltage output module. The magnetic induction module is configured to sense an external magnetic field to generate a first voltage signal. The voltage comparison module is configured to receive the first voltage signal, and output a second voltage signal. The voltage output module is configured to process the second voltage signal and output a third voltage signal.

18 Claims, 7 Drawing Sheets

(56) References Cited

U.S. PATENT DOCUMENTS

2016/0349083 A1* 12/2016 Guo ................. H02P 7/295
2023/0109636 A1*  4/2023 Vorndran ........... G01R 19/0007
                                                       324/114

FOREIGN PATENT DOCUMENTS

| CN | 105846811 A | 8/2016 |
| CN | 107315149 A | 11/2017 |
| CN | 111654934 A | 9/2020 |

* cited by examiner

MAGNETIC INDUCTION CIRCUIT, MAGNETIC-CONTROLLED SWITCH CIRCUIT, CIRCUIT BOARD, MAGNETIC-CONTROLLED DEVICE, AND MAGNETIC-CONTROLLED LAMP

CROSS-REFERENCE TO RELATED APPLICATIONS

This application is a continuation of International Patent Application No. PCT/CN2020/122557, filed on Oct. 21, 2020, which claims the benefit of priority from Chinese Patent Application No. 202010371536.X, filed on May 6, 2020. The content of the aforementioned application, including any intervening amendments thereto, is incorporated herein by reference in its entirety.

TECHNICAL FIELD

This application relates to magnetic control technologies, and more particularly to a magnetic induction circuit, a magnetic-controlled switch circuit, a circuit board, a magnetic-controlled device, and a magnetic-controlled lamp.

BACKGROUND

At present, the output of a variety of voltages based on magnetic induction is performed generally by means of buttons and touch sensors, which lead to poor adjustment and control accuracy. Due to the single configuration of the magnetic-induction component, it is difficult to achieve the accurate adjustment within a certain range, affecting the using experience. For example, the lamp brightness can only be adjusted between the fixed levels, and cannot be precisely and smoothly adjusted as required.

SUMMARY

An objective of this application is to provide a magnetic induction circuit, a magnetic-controlled switch circuit and a magnetic-controlled device to enable the accurate multi-stage voltage adjustment and continuous control.

Technical solutions of this application are described as follows.

In a first aspect, this application provides a magnetic induction circuit, comprising:
  a magnetic induction module;
  a voltage comparison module; and
  a voltage output module;
  wherein the magnetic induction module is configured to sense an external magnetic field and output a first voltage signal;
  an input end of the voltage comparison module is connected to an output end of the magnetic induction module; and the voltage comparison module is configured to receive the first voltage signal, and compare the first voltage signal with a reference voltage to output a second voltage signal; and
  an input end of the voltage output module is connected to an output end of the voltage comparison module; and the voltage output module is configured to process the second voltage signal and output a third voltage signal based on the voltage division relationship.

Compared with the prior art, the magnetic induction circuit provided herein has the following beneficial effects.

With respect to the magnetic induction circuit provided herein, the magnetic induction module is configured to sense an external magnetic field to generate a voltage signal, which is compared with the threshold value of the voltage comparison module. Once the voltage value reaches the threshold value, the voltage comparison module outputs a second voltage signal, so as to realize the adjustable voltage output.

In an embodiment, the magnetic induction module comprises a bipolar linear Hall-effect sensor.

In an embodiment, the voltage comparison module comprises a first reference voltage terminal and a second reference voltage terminal; wherein the first reference voltage terminal and the second reference voltage terminal are configured for connection with the reference voltage, so as to output the second voltage signal.

In an embodiment, the voltage comparison module comprises a first operational amplifier and a second operational amplifier; an inverting input terminal of the first operational amplifier is configured for connection with the first reference voltage terminal, and a non-inverting input terminal of the second operational amplifier is configured for connection with the second reference voltage terminal; a non-inverting input terminal of the first operational amplifier and an inverting input terminal of the second operational amplifier are respectively connected to the output end of the magnetic induction module. The first reference voltage terminal is configured to apply the first reference voltage, and the second reference voltage terminal is configured to apply the second reference voltage. Combining with the first voltage signal, whether the output second voltage signal is a high level signal is determined.

In an embodiment, the voltage comparison module further comprises a first diode and a second diode; an anode of the first diode is connected to an output terminal of the first operational amplifier, and an anode of the second diode is connected to an output terminal of the second operational amplifier; and a cathode of the first diode is connected to a cathode of the second diode.

In an embodiment, the voltage output module comprises at least one voltage output unit; an output end of each of the at least one voltage output unit is configured as a first voltage output terminal; and the at least one voltage output unit is configured to output the third voltage signal through the first voltage output terminal based on the second voltage signal.

In an embodiment, the voltage output module further comprises an active locking terminal and a passive locking terminal; wherein the active locking terminal and the passive locking terminal are configured to collaboratively control an output of the third voltage signal.

In an embodiment, the voltage output module includes a first transistor and a second transistor; a gate electrode of the first transistor and a gate electrode of the second transistor are respectively connected to the output end of the voltage comparison module; a source electrode of the first transistor is configured as a first voltage output terminal, and a source electrode of the second transistor is configured as an active locking terminal; and a first resistor is provided between the gate electrode and a drain electrode of the first transistor.

In an embodiment, the voltage output module further comprises a passive locking terminal; and the passive locking terminal is connected to the output end of the voltage comparison module. When there are a plurality of magnetic induction circuits, an active locking terminal of one of the magnetic induction circuits is connected to a passive locking terminal of an adjacent magnetic induction circuit. At this time, the active locking terminal can cause failure in the magnetic induction circuit whose passive locking terminal is connected to the active locking terminal, such that only one magnetic induction circuit is effective at the same moment, thereby realizing the low level first.

In an embodiment, the magnetic induction module comprises a Hall-effect sensor.

In a second aspect, this application provides a magnetic-controlled switching circuit, comprising at least one magnetic induction circuit mentioned in the first aspect and a control module. The control module comprises a reference voltage divider resistor, at least one variable resistor, a voltage input terminal connected to the first voltage output terminal and a second voltage output terminal; the voltage input terminal is connected to the at least one variable resistor and the reference voltage divider resistor in sequence; and a first end of the at least one variable resistor is connected to the voltage input terminal, and a second end of the at least one variable resistor is connected to the reference voltage divider resistor and the second voltage output terminal.

Compared with the prior art, the magnetic-controlled switch circuit provided herein has the following beneficial effects.

In order to achieve the precise voltage regulation, a plurality of magnetic induction circuits are assembled in the magnetic-controlled switch circuit, such that a regularly-varying voltage sequence can be output by appropriately adjusting the voltage division relationship of the control module.

In an embodiment, the first reference voltage terminal is connected to the first reference voltage, and the second reference voltage terminal is connected to the second reference voltage.

In an embodiment, an active locking terminal of one of the at least one magnetic induction circuit is connected to a passive locking terminal of another magnetic induction circuits.

A specific regular voltage sequence can be output by appropriately adjusting the voltage division relationship of the control modules and the "low level first" effect. Theoretically, a plurality of magnetic induction circuits can be arranged to achieve the precise voltage output, so as to realize the gradually-varying control effect and improve the user experience.

In a third aspect, this application provides a circuit board, comprising the magnetic induction circuit mentioned in the first aspect.

In an embodiment, the circuit board comprises the magnetic-controlled switching circuit mentioned in the second aspect.

In a fourth aspect, this application provides a magnetic-controlled device, comprising the magnetic-controlled switch circuit mentioned in the second aspect.

The magnetic-controlled device further comprises an accommodating member; wherein the magnetic-controlled switch circuit is provided in the accommodating member.

Compared with the prior art, the magnetic-controlled device provided herein has the following beneficial effects.

The magnetic-controlled device containing the magnetic-controlled switch circuit is configured to appropriately adjust the voltage division relationship among the control modules and perform the "low level first" function to output the regularly-varying voltage sequence. Theoretically, a plurality of magnetic induction circuits are allowed to be arranged to achieve precise voltage output, so as to realize the gradually-varying control effect and improve the user experience.

In an embodiment, the magnetic-controlled switching device comprises a plurality of magnetic-controlled switch circuits; the plurality of magnetic-controlled switch circuits are arranged according to an ascending order, or a descending order, or in a cyclical arrangement manner according to output voltages of the plurality of magnetic-controlled switch circuits through the second voltage output terminal, so as to form a magnetic-controlled switch circuit array. For different product requirements, the arrangement order of the plurality of magnetic-controlled switch circuits is adjustable, thereby realizing the gradually-varying effect.

In a fifth aspect, this application provides a magnetic-controlled lamp, comprising the magnetic-controlled switch circuit mentioned in the second aspect.

Compared with the prior art, the magnetic-controlled lamp provided herein has the following beneficial effects.

The magnetic-controlled switch circuit in the magnetic-controlled lamp is configured to appropriately adjust the voltage division relationships of the control modules and perform the low level first effect, so as to output the magnetic-controlled switch circuit array arranged according to a specific order. Theoretically, a plurality of magnetic induction circuits are allowed to be arranged to achieve precise voltage output, so as to realize the gradually-varying control effect and improve the user experience

Figure 1:
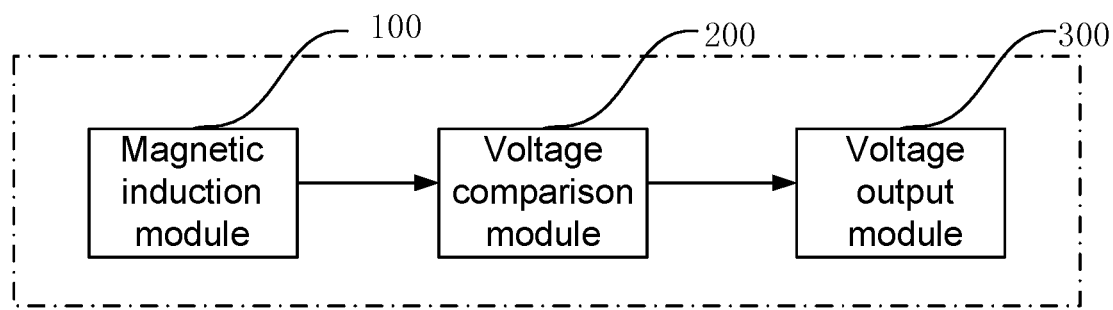
FIG. 1 is a structural block diagram of a magnetic induction circuit according to an embodiment of this application.

In the drawings, 100, magnetic induction module; 200, voltage comparison module; and 300, voltage output module.

DETAILED DESCRIPTION OF EMBODIMENTS

This application will be described in detail below with reference to the embodiments and accompanying drawings to make the objectives, technical solutions, and advantages of this application clearer. It should be understood that these embodiments are only illustrative of the application, and are not intended to limit this application. It should be noted that based on the embodiments of this application, other embodiments obtained by those skilled in the art without paying any creative effort shall fall within the protection scope of this application.

It should be noted that as used herein, the orientation and position relationship indicated by terms such as "up", "down", "front", "rear", "left" and "right" is based on the positional relationships shown in the accompanying drawings. These terms are merely for the convenience of describing f this application and simplifying the description, rather than indicating or implying that the referred device or element must have the specific orientation, be constructed or operated in a particular orientation. Terms "arrangement", "fixing", "connection" and "installation" may indicate direct arrangement, fixing, connection and installation, or indirect arrangement, fixing, connection and installation.

As used herein, the term involving "several" means one or more, and the term involving "multiple" means two or more; the terms involving "greater than", "less than", "exceeding" should be understood as excluding the referred number; the terms involving "above", "below", "within" should be understood as including the referred number. In addition, terms, such as "first" and "second", are merely used for distinguishing the technical features, but should not be understood as indicating or implying relative importance, the number or the sequence of the indicated technical features.

At present, the output of a variety of voltages based on magnetic induction is performed generally by means of buttons and touch sensors, which lead to poor adjustment and control accuracy. Due to the single configuration of the magnetic-induction component, it is difficult to achieve the accurate adjustment within a certain range, affecting the using experience. For example, the lamp brightness can only be adjusted between the fixed levels, and cannot be precisely and smoothly adjusted as required.

A magnetic induction circuit, a magnetic-controlled switch circuit, a circuit board, a magnetic-controlled device, and a magnetic-controlled lamp are provided herein.

Referring to an embodiment shown in FIG. 1, a magnetic induction circuit includes a magnetic induction module 100, a voltage comparison module 200 and a voltage output module 300. An input end of the voltage comparison module 200 is connected to an output end of the magnetic induction module 100, and an input end of the voltage output module 300 is connected to an output end of the voltage comparison module 200.

In some embodiments, the magnetic induction module 100 includes a bipolar linear Hall-effect sensor U1 (hereinafter referred to as "Hall-effect sensor"). The magnetic induction module 100 is configured to sense an external magnetic field, output a first voltage signal, and send the first voltage signal to the voltage comparison module 200. The voltage comparison module 200 is connected to a reference voltage and configured to compare the reference voltage with the first voltage signal to determine whether the first voltage signal reaches a threshold value of the voltage comparison module 200. If yes, the voltage comparison module 200 is configured to output a high level signal. If not, the voltage comparison module 200 is configured to output a low level signal. The high level signal or low level signal output by the voltage comparison module 200 is the second voltage signal. The voltage output module 300 is configured to receive the second voltage signal sent by the voltage comparison module 200. When the second voltage signal is the high level signal, the high level signal causes the voltage output module 300 to conduct, so as to output the voltage.

Figure 2:
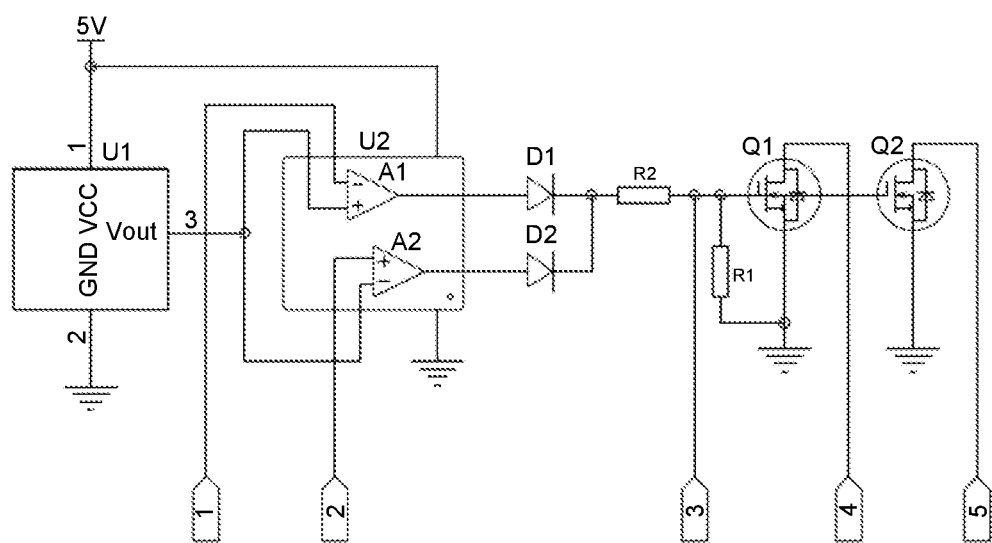
FIG. 2 shows a circuit structure of the magnetic induction circuit an embodiment of this application.

In this embodiment, the magnetic induction module is configured to sense an external magnetic field to generate a voltage signal, which is compared with the threshold value of the voltage comparison module 200. Once the voltage value reaches the threshold value, the voltage comparison module 200 outputs a second voltage signal, so as to realize the adjustable voltage output The magnetic induction circuit is structurally illustrated in FIG. 2. The bipolar linear Hall-effect sensor U1 includes a first pin 1, a second pin 2 and a third pin 3. The first pin 1 is connected to a 5-volt power supply; the second pin 2 is grounded; and the third pin 3 is configured as an output terminal of the Hall-effect sensor U1 to sense the external magnetic field and output the first voltage signal.

In some embodiments, the voltage comparison module 200 includes a first reference voltage terminal and a second reference voltage terminal. The first reference voltage terminal and the second reference voltage terminal are configured for connection with the reference voltage, such that the voltage comparison module 200 is configured to output the second voltage signal.

In a specific embodiment, the voltage comparison module 200 includes a first operational amplifier A1 and a second operational amplifier A2. An inverting input terminal of the first operational amplifier A1 is configured for connection with the first reference voltage terminal, and a non-inverting input terminal of the second operational amplifier A2 is configured for connection with the second reference voltage terminal. A non-inverting input terminal of the first operational amplifier A1 and an inverting input terminal of the second operational amplifier A2 are respectively connected to the output end of the magnetic induction module 100. Specifically, a first port 1 of the magnetic induction circuit is the first reference voltage terminal, and a second port 2 of the magnetic induction circuit is the second reference voltage terminal.

In some embodiments, the voltage output module 300 includes at least one voltage output unit. An output end of each of the at least one voltage output unit is configured as the first voltage output terminal. The at least one voltage output unit is configured to output the third voltage signal through the first voltage output terminal based on the second voltage signal.

In a specific embodiment, the voltage output module 300 includes a first transistor Q1 and a second transistor Q2. A gate electrode of the first transistor Q1 and a gate electrode of the second transistor Q2 are respectively connected to the output end of the voltage comparison module 200. A source electrode of the first transistor Q1 is configured as the first voltage output terminal, and a source electrode of the second transistor Q2 is configured as an active locking terminal. A first resistor R1 is provided between the gate electrode and a drain electrode of the first transistor Q1. R1 is a bleeder resistor for the gate charge of the metal oxide semiconductor field effect transistor (MOSFET). R1 is configured to subject the residual charge on the gate electrode to bleed, so as to ensure the safety of personnel and the magnetic induction circuit. Specifically, an end of a fourth port 4 of the magnetic induction circuit connected to the first transistor Q1 is the first voltage output terminal (as shown in point A in FIG. 2). A fifth port 5 of the magnetic induction circuit is the active locking terminal.

In some embodiment, the voltage output module 300 further includes a second resistor R2. R2 is a current-limiting resistance, which is configured to limit the current output by the voltage comparison module 200, so as to protect the magnetic induction circuit.

In a specific embodiment, the first reference voltage terminal and the second reference voltage terminal are respectively connected to the first reference voltage and the second reference voltage. The first reference voltage VRFE1 is allowed to be a reference voltage greater than 2.5 V, and the second reference voltage VRFE2 is allowed to be a reference voltage less than 2.5 V. In this embodiment, the first reference voltage VRFE1 and the second reference voltage VRFE2 are 3.5 V and 1.5 V, respectively.

Figure 3:
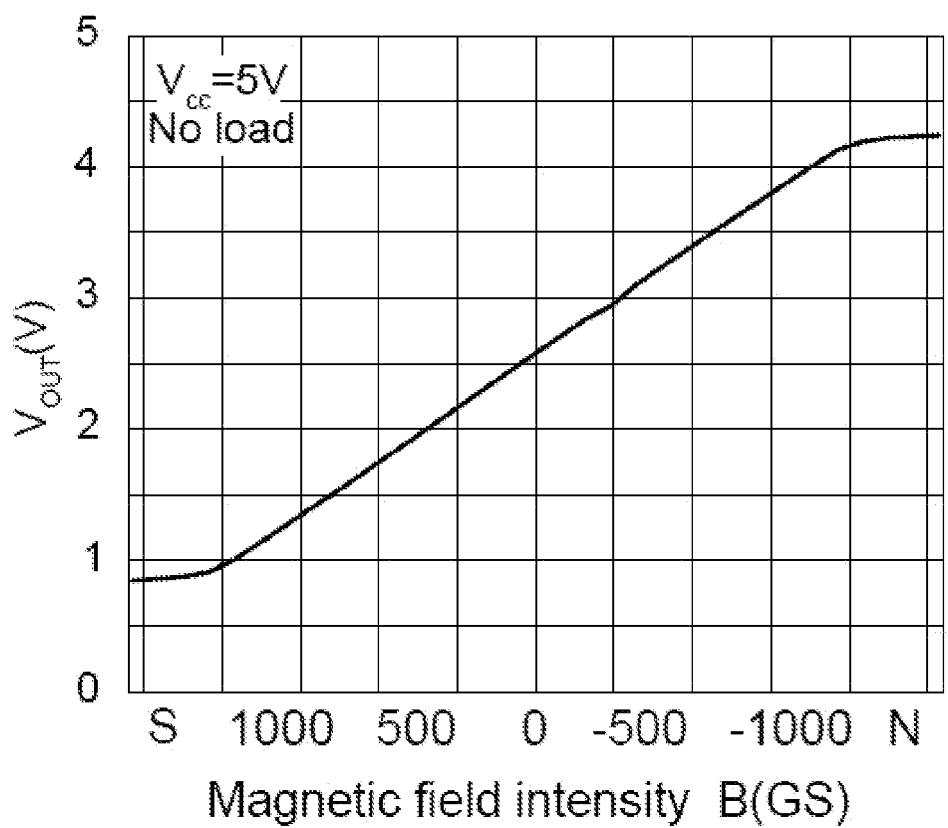
FIG. 3 shows a variation of an output voltage of a Hall-effect sensor with magnetic field intensity according to an embodiment of this application.

FIG. 3 shows a variation of an output voltage of the Hall-effect sensor U1 with magnetic field intensity. Referring to an embodiment shown in FIG. 3, a linear range of the Hall-effect sensor U1 is varied from −1000 GS to 1000 GS, and the north pole (N pole) and the south pole (S pole) are symmetric. When the Hall-effect sensor U1 is in a 0 GS magnetic field, the output voltage is about 2.5V, which fails to reach the threshold value of the voltage comparison module 200, such that the second voltage signal output by the voltage comparison module 200 is the low level signal. The first transistor Q1 and the second transistor Q2 are not in conducting stage, and the third voltage signal is output as 0.

When the N pole of the Hall-effect sensor U1 senses a magnetic field, and the intensity of the magnetic field makes the voltage of the third pin 3 of the Hall-effect sensor U1 greater than 3.5 V, the voltage comparison module 200 is configured to output a high level signal.

When the S pole of the Hall-effect sensor U1 senses a magnetic field, and the intensity of the magnetic field makes the voltage of the third pin 3 of the Hall-effect sensor U1 lower than 3.5 V, the voltage comparison module 200 is configured to output a low level signal.

In this embodiment, the voltage of the first reference voltage VRFE1 and the voltage of the second reference voltage VRFE2 are adjusted to adjust the sensitivity of the magnetic field. When the first reference voltage VRFE1 decreases, the sensitivity of the magnetic field increases, and when the second reference voltage VRFE2 increases, the sensitivity of the magnetic field increases, and vice versa.

In other words, no matter the N pole or the S pole of the Hall-effect sensor U1 senses the magnetic field, once the magnetic field intensity makes the voltage of the third pin 3 of the voltage comparison module 200 exceed the preset threshold of the voltage comparison module 200, the voltage comparison module 200 is configured to output a high level signal, so as to allow driving voltage make the first transistor Q1 and the second transistor Q2 conduct, and output a non-zero third voltage signal. The third voltage signal is the output voltage of the magnetic induction circuit.

In some embodiments, the voltage comparison module 200 further includes a first diode D1 and a second diode D2. D1 and D2 are isolating diodes, and configured to isolate the first operational amplifier A1 and the second operational amplifier A2, so as to avoid short circuit. An anode of the first diode D1 is connected to the output terminal of the first operational amplifier A1, an anode of the second diode D2 is connected to the output terminal of the second operational amplifier A2, and the cathode of the first diode D1 is connected to the cathode of the second diode D2.

In some embodiments, the voltage output module 300 further includes a passive locking terminal. The passive locking terminal is provided between the voltage comparison module 200 and the voltage output module 300. When there are a plurality of magnetic induction circuits, an active locking terminal of one of the plurality of magnetic induction circuits is connected to a passive locking terminal of another magnetic induction circuit. At this time, the active locking terminal can cause failure in the magnetic induction circuit whose passive locking terminal is connected to the active locking terminal, such that only one magnetic induction circuit is effective at the same time, thereby realizing the low level first. A third port 3 of the magnetic induction circuit is the passive locking terminal.

In a second aspect, a magnetic-controlled switch circuit is provided. The magnetic-controlled switch circuit includes at least one magnetic induction circuit and a control module. The control module includes a reference voltage divider resistor RH, at least one variable resistor, a first voltage input terminal (as shown in point B in FIG. 4), a second voltage output terminal V0. The voltage input terminal is connected to the at least one variable resistor and the reference voltage divider resistor RH (hereinafter referred to as "reference voltage divider resistor") that is configured as a voltage divider reference in sequence. A first end of the at least one variable resistor is connected to the voltage output terminal, and a second end of the at least one variable resistor is connected to the reference voltage divider resistor RH and the second voltage output terminal V0.

Figure 4:
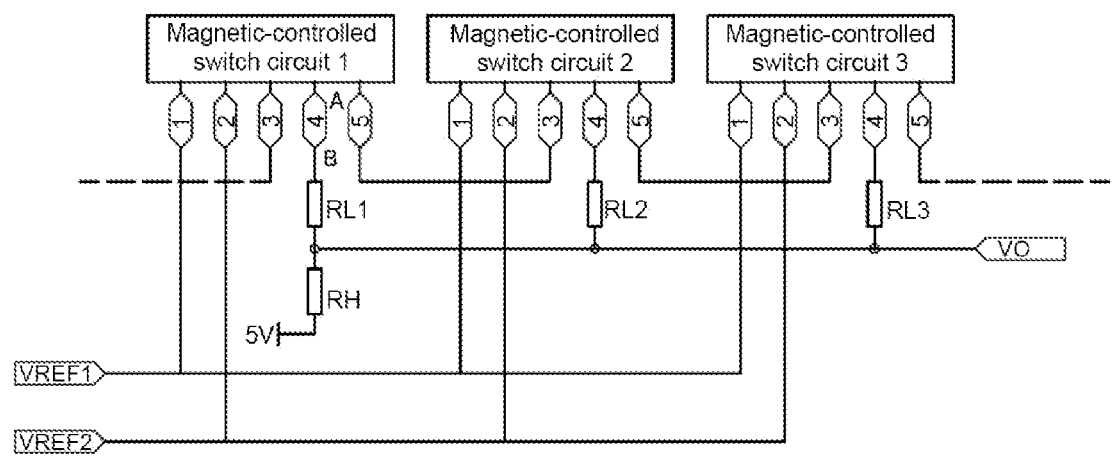
FIG. 4 is a structural block diagram of a magnetic-controlled switch circuit according to an embodiment of this application.

Referring to an embodiment shown in FIG. 4, the magnetic-controlled switch circuit includes three magnetic induction circuits. The three magnetic induction circuits include a first magnetic induction circuit, a second magnetic induction circuit and a third magnetic induction circuit. A voltage input terminal of the first magnetic induction circuit is connected to a first end of a first variable resistor RL1. A voltage input terminal of the second magnetic induction circuit is connected to a first end of a second variable resistor RL2. And a voltage input terminal of the third magnetic induction circuit is connected to a first end of a third variable resistor RL3. A second end of each of the first variable resistor RL1, the second variable resistor RL2 and the third variable resistor RL3 is connected to the second voltage output terminal V0 and the reference voltage divider resistor RH. The voltage output by the first voltage output terminal is allowed to be divided by the corresponding variable resistor and the reference voltage divider resistor RH, so as to output the different voltages. The different resistance values of the variable resistor are set to determine the different division relationships, so as to output different voltages.

In an embodiment, the resistance values of the first variable resistor RL1, the second variable resistor RL2, and the third variable resistor RL3 increase in sequence, and accordingly the voltage division values of the corresponding three variable resistors increase in sequence, such that the second voltage output terminal V0 is configured to output the successively decreased voltages.

In another embodiment, the resistance values of the first variable resistor RL1, the second variable resistor RL2, and the third variable resistor RL3 decrease in sequence, and accordingly the voltage division values of the corresponding three variable resistors each decrease in sequence, such that the second voltage output terminal V0 is configured to output the successively increased voltages.

In another embodiment, the resistance values of the first variable resistor RL1, the second variable resistor RL2, and the third variable resistor RL3 increase and then decrease in sequence, and accordingly the voltage division values of the corresponding three variable resistors increase and then decrease in sequence, such that the second voltage output terminal V0 is configured to output the voltages that are firstly decreased and then increased.

It should be understood that the resistance value of the variable resistor are allowed to be changed as required to obtain other voltage division relationships, so as to obtain different situations of voltage changes, such as cyclical changes or periodic changes.

In some embodiments, when the magnetic-controlled switch circuit includes a plurality of magnetic induction circuits, the active locking terminal is allowed to be connected to the passive locking terminal. At this time, the active locking terminal is configured to damage the magnetic induction circuit whose passive locking terminal is connected to the active locking terminal, such that only one magnetic induction circuit is effective at the same time, thereby realizing the low level first, so as to make the second voltage output terminal V0 output only one valid voltage at a time.

Referring to an embodiment shown in FIG. 4, under the connection between the active locking terminal of one magnetic-controlled switch circuit and the passive locking terminal of another magnetic-controlled switch circuit, when two adjacent magnetic-controlled switch circuits both sense the magnetic field, the active locking terminal outputs a low voltage level, and allow the passive locking terminal connected thereto to also output a low voltage level, resulting in no output and realizing the low-level locking effect.

In some embodiments, in order to achieve the precise voltage regulation, a plurality of magnetic induction circuits are assembled in the magnetic-controlled switch circuit, such that a specific regular voltage sequence can be output by appropriately adjusting the voltage division relationships and the "low level first" effect. Theoretically, a plurality of magnetic induction circuits can be arranged to achieve the precise voltage output, so as to realize the gradually-varying control effect and improve the user experience.

Figure 6:
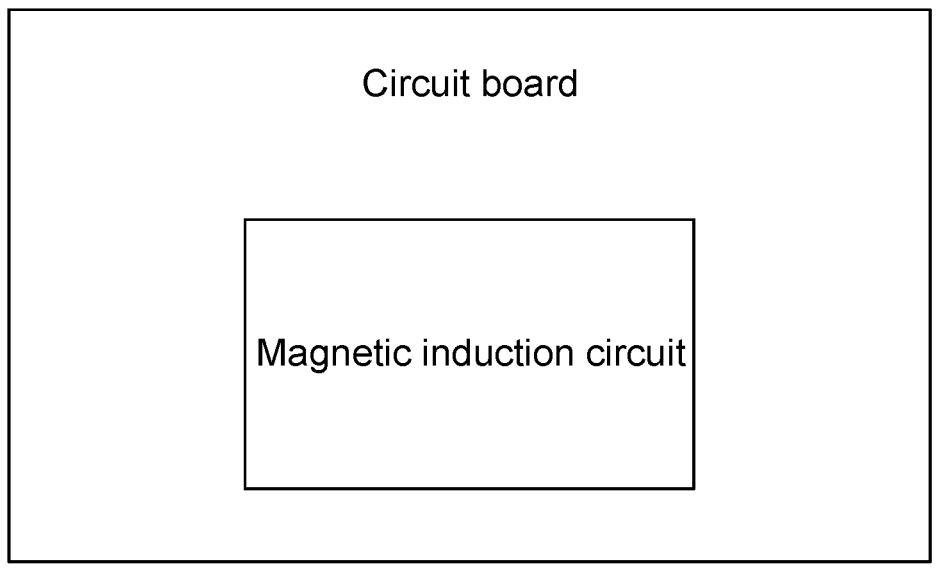
FIG. 6 is a structural diagram of a circuit board according to an embodiment of this application.
Figure 7:
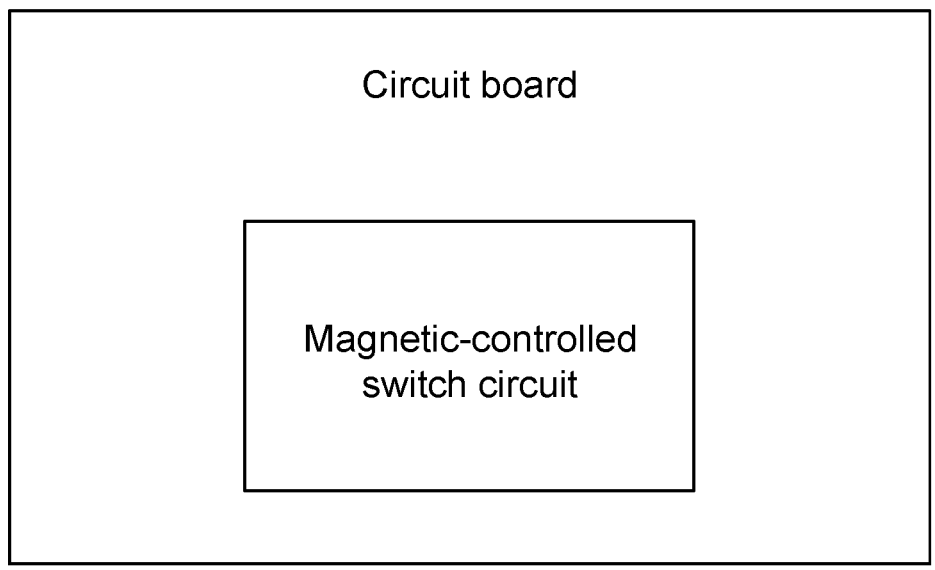
FIG. 7 is a structural diagram of the circuit board according to another embodiment of this application.

In a third aspect, referring to FIGS. 6 and 7, a circuit board is provided, which includes the magnetic induction circuit or the magnetic-controlled switch circuit mentioned above.

In a fourth aspect, a magnetic-controlled device is provided. The magnetic-controlled device includes the magnetic-controlled switch circuit mentioned above and an accommodating member. The magnetic-controlled switch circuit is provided in the accommodating member. The magnetic-controlled switch circuit includes a plurality of magnetic-controlled switch circuits. The plurality of magnetic-controlled switch circuits are arranged according to an ascending order, or a descending order, or in a cyclical arrangement manner or other orders of an output voltages of the plurality of the magnetic-controlled switch circuits, so as to form a magnetic-controlled switch circuit array. Specific examples are described below.

Figure 5A:
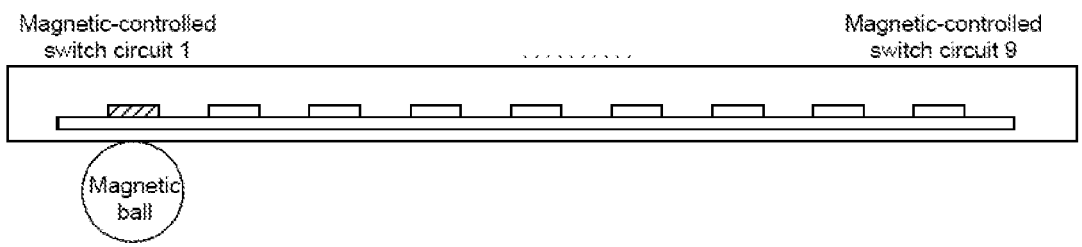
FIGS. 5a-5c schematically show control of a magnetic-controlled switch circuit array according to an embodiment of this application.
Figure 5B:
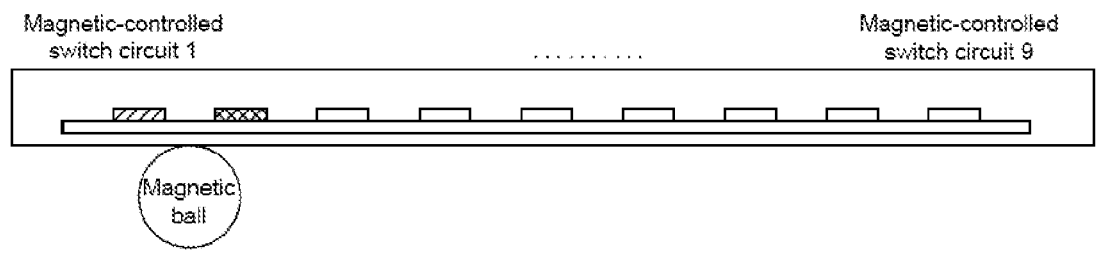
Figure 5C:
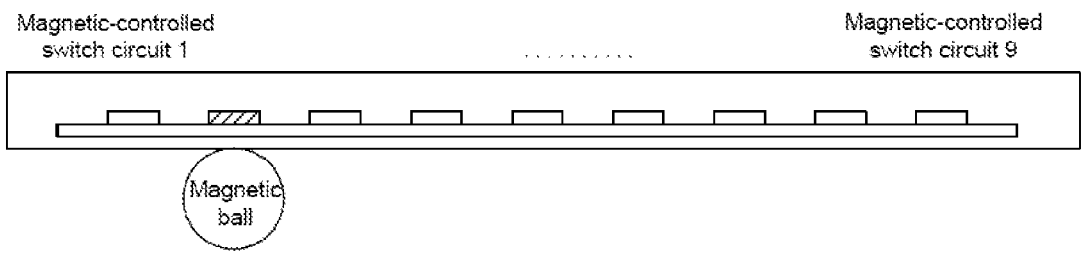

In a fifth aspect, a magnetic-controlled lamp is provided to further illustrate the principle of the magnetic-controlled switch circuit. Referring to FIGS. 5a-5c, in order to realize the magnetic control of the magnetic-controlled lamp, the magnetic-controlled lamp includes the magnetic-controlled component for providing the external magnetic field. In this embodiment, the magnetic-controlled component is a magnetic ball. It should be understood that the magnetic-controlled components can be designed into other shapes, such as a cube, a cuboid, a spherical magnetic control with a notch, etc., and are all allowed to be used in the magnetic-controlled lamp.

In this embodiment, the accommodating member is a tube made of magnetic materials (such as iron, cobalt, nickel, etc.). In an embodiment, the tube has a thickness of 0.6 mm. According to product requirements, the cross section of the tube can be round, square, triangular and other various shapes. The accommodating member includes a plurality of magnetic-controlled switch circuits to form a magnetic-controlled switch circuit array. In this embodiment, the accommodating member is an iron circular tube. When the magnetic ball slides through the outside of the iron circular tube, the plurality of magnetic-controlled switch circuits sense the magnetic field intensity of the magnet ball, so as to make the corresponding magnetic-controlled switch circuit at the corresponding place act, and output the corresponding output voltage according to the voltage division relationship determined by the plurality of magnetic-controlled switch circuits.

FIGS. 5a-5c schematically show a control of a magnetic-controlled switch circuit array. Referring to an embodiment shown in FIG. 5a, when the magnetic ball moves to a perpendicular direction of one of the plurality of magnetic-controlled switch circuits, the corresponding magnetic-controlled switch circuit starts to act. Referring to an embodiment shown in FIG. 5b, when the magnetic ball moves between the two of the plurality of magnetic-controlled switch circuits, since two adjacent magnetic-controlled switch circuits are connected to each other through the active locking terminal and the passive locking terminal, one of the two adjacent magnetic-controlled switch circuits continues to act, and the magnetic induction module 100 of the other magnetic-controlled switch circuit senses the magnetic field and acts. However, due to the low level first effect, the magnetic-controlled switch circuit fails to output voltage (that is, does not act). Referring to an embodiment shown in FIG. 5c, when the magnetic ball moves to a perpendicular direction of the next magnetic-controlled switch circuit, the corresponding magnetic-controlled switch circuit acts, and so on.

In a magnetic-controlled switch circuit array of the magnetic-controlled lamp, at any position, only one magnetic-controlled switch circuit outputs voltage, and there will be no voltage interruption, which are realized by the control modules based on the low level first effect, such that the control reliability has been improved. Moreover, a regularity-varying voltage sequence is allowed to be formed between the output voltages to provide a gradually-varying control effect. Theoretically, an unlimited number of magnetic-controlled switch circuits are allowed to be arranged to achieve a more precise multi-stage voltage adjustment, so as to make the brightness variation "smoother", and improving the user experience.

At the same time, in order to achieve a good sliding effect between the magnetic ball and the tube, when the tube is placed vertically, the magnetic ball is configured to roll up and down along the tube without falling.

It should be noted that when the magnetic ball acts on the tube, the loss of most of the magnetic field will occur along the tube wall, and only a small part of the magnetic field enters the tube. The magnetic-controlled switch circuit array is established to detect the magnetic field leaking into the iron tube, so as to adjust the output voltage of the magnetic-controlled switch circuit. In some embodiments, when the magnetic ball is turned to the rear part of the tube, the magnetic induction module 100 fails to detect the magnetic signal, thereby achieving the shutdown. At the same time, the magnetic ball and the induction switch circuit adopt non-contact control, so as to achieve the waterproof function and dustproof function.

In some embodiments, the magnetic-controlled switch circuits in the accommodating member are allowed to be arranged according to an ascending order, or a descending order or in a cyclical arrangement manner according to output voltages of the second voltage output terminal, so as to combine different product requirements and achieve different gradually-varying control.

It should be understood that the magnetic-controlled lamp provided herein is only an application scenario of the magnetic-controlled switch circuit. The magnetic-controlled switch circuit provided herein can be applied in any scenarios that require accurately control through the magnetic induction, such as speed adjustment, volume adjustment, flow adjustment, so as to achieve the more accurate control effect.

Described above are merely illustrative of the application, which are not intended to limit the scope of the application. It should be understood that any changes made by those skilled in the art without departing from the spirit of the application shall fall within the scope of the present application defined by the appended claims. In the absence of contradiction, embodiments of this application and features of the embodiments may be combined with each other.

What is claimed is:

1. A magnetic induction circuit, comprising:
   a magnetic induction module;
   a voltage comparison module; and
   a voltage output module;
   wherein the magnetic induction module is configured to sense an external magnetic field and output a first voltage signal;
   an input end of the voltage comparison module is connected to an output end of the magnetic induction module; and the voltage comparison module is configured to receive the first voltage signal, and compare the first voltage signal with a reference voltage to output a second voltage signal;
   an input end of the voltage output module is connected to an output end of the voltage comparison module; and the voltage output module is configured to process the second voltage signal and output a third voltage signal; and
   the voltage comparison module comprises a first reference voltage terminal and a second reference voltage terminal; the first reference voltage terminal is connected to a first reference voltage, and the second reference voltage terminal is connected to a second reference voltage, so as to output the second voltage signal;
   wherein the voltage comparison module comprises a first operational amplifier and a second operational amplifier; an inverting input terminal of the first operational amplifier is configured for connection with the first reference voltage terminal, and a non-inverting input terminal of the second operational amplifier is configured for connection with the second reference voltage terminal; a non-inverting input terminal of the first operational amplifier and an inverting input terminal of the second operational amplifier are respectively connected to the output end of the magnetic induction module.

2. The magnetic induction circuit of claim 1, wherein the magnetic induction module comprises a bipolar linear Hall-effect sensor.

3. The magnetic induction circuit of claim 1, wherein the voltage comparison module further comprises a first diode and a second diode; an anode of the first diode is connected to an output terminal of the first operational amplifier, and an anode of the second diode is connected to an output terminal of the second operational amplifier; and a cathode of the first diode is connected to a cathode of the second diode.

4. The magnetic induction circuit of claim 1, wherein the voltage output module comprises at least one voltage output unit; an output end of each of the at least one voltage output unit is configured as a first voltage output terminal; and the at least one voltage output unit is configured to output the third voltage signal through the first voltage output terminal based on the second voltage signal.

5. The magnetic induction circuit of claim 1, wherein the voltage output module further comprises an active locking terminal and a passive locking terminal; and the active locking terminal and the passive locking terminal are configured to collaboratively control an output of the third voltage signal.

6. The magnetic induction circuit of claim 1, wherein the voltage output module comprises a first transistor and a second transistor; a gate electrode of the first transistor and a gate electrode of the second transistor are respectively connected to the output end of the voltage comparison module; a source electrode of the first transistor is configured as a voltage output terminal, and a source electrode of the second transistor is configured as an active locking terminal; and a resistor is provided between the gate electrode of the first transistor and a drain electrode of the first transistor.

7. The magnetic induction circuit of claim 5, wherein the active locking terminal is configured to output a low level signal when the second voltage signal is a high level signal.

8. A circuit board, comprising:
   the magnetic induction circuit of claim 1.

9. A magnetic-controlled switch circuit, comprising:
   at least one magnetic induction circuit, comprising:
      a magnetic induction module;
      a voltage comparison module; and
      a voltage output module; and
   a control module;
   wherein the magnetic induction module is configured to sense an external magnetic field and output a first voltage signal;
   an input end of the voltage comparison module is connected to an output end of the magnetic induction module; and the voltage comparison module is configured to receive the first voltage signal, and compare the first voltage signal with a reference voltage to output a second voltage signal;
   an input end of the voltage output module is connected to an output end of the voltage comparison module; and the voltage output module is configured to process the second voltage signal and output a third voltage signal;
   the voltage comparison module comprises a first reference voltage terminal and a second reference voltage terminal; the first reference voltage terminal is connected to a first reference voltage, and the second reference voltage terminal is connected to a second reference voltage, so as to output the second voltage signal;
   the voltage output module comprises at least one voltage output unit; an output end of each of the at least one voltage output unit is configured as a first voltage output terminal; and the at least one voltage output unit is configured to output the third voltage signal through the first voltage output terminal based on the second voltage signal;
   wherein the control module comprises a reference voltage divider resistor, at least one variable resistor, a voltage input terminal connected to the first voltage output terminal, and a second voltage output terminal; the voltage input terminal is connected to the at least one variable resistor and the reference voltage divider resistor in sequence; and a first end of the at least one variable resistor is connected to the voltage input terminal, and a second end of the at least one variable resistor is connected to the reference voltage divider resistor and the second voltage output terminal.

10. The magnetic-controlled switch circuit of claim 9, wherein each of the at least one magnetic induction circuit comprises an active locking terminal and a passive locking terminal; and the active locking terminal of one of adjacent two magnetic induction circuits is connected to the passive locking terminal of the other of the adjacent two magnetic induction circuits.

11. The magnetic-controlled switch circuit of claim 9, wherein resistances of the at least one variable resistor are set to decrease successively, increase successively, first increase and then decrease, or first decrease and increase according to a connection sequence of the at least one magnetic induction circuit.

12. A circuit board, comprising:
the magnetic-controlled switch circuit of claim 9.

13. A magnetic-controlled device, comprising:
the magnetic-controlled switch circuit of claim 9; and
an accommodating member;
wherein the magnetic-controlled switch circuit is provided in the accommodating member.

14. The magnetic-controlled device of claim 13, wherein the magnetic-controlled switch circuit comprises a plurality of magnetic-controlled switch circuits; the plurality of magnetic-controlled switch circuits are arranged according to an ascending order or a descending order, or in a cyclical arrangement manner according to output voltages of the plurality of magnetic-controlled switch circuits, so as to form a magnetic-controlled switch circuit array.

15. The magnetic-controlled device of claim 14, wherein the accommodating member comprises a tubular component made of a magnetic material; and the magnetic-controlled switch circuit array is arranged in the tubular component.

16. The magnetic-controlled device of claim 13, wherein the magnetic-controlled device comprises a magnetic-controlled component; the magnetic-controlled component is configured to provide a magnetic field for the magnetic-controlled switch circuit, so as to realize non-contact control of the magnetic-controlled switch circuit.

17. The magnetic-controlled device of claim 15, wherein the magnetic-controlled device comprises a magnetic ball; the magnetic ball is configured to roll along an outer surface of the tubular component; and when the tubular component is placed vertically, the magnetic ball is configured to roll vertically along the tubular component without falling off from the tubular component.

18. A magnetic-controlled lamp, comprising:
the magnetic-controlled switch circuit of claim 9.

* * * * *